(12) United States Patent
Arimilli et al.

(10) Patent No.: US 6,546,469 B2
(45) Date of Patent: Apr. 8, 2003

(54) MULTIPROCESSOR SYSTEM SNOOP SCHEDULING MECHANISM FOR LIMITED BANDWIDTH SNOOPERS

(75) Inventors: Ravi Kumar Arimilli, Austin, TX (US); James Stephen Fields, Jr., Austin, TX (US); Sanjeev Ghai, Round Rock, TX (US); Guy Lynn Guthrie, Austin, TX (US); Jody B. Joyner, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 57 days.

(21) Appl. No.: 09/749,328

(22) Filed: Mar. 12, 2001

(65) Prior Publication Data

US 2002/0129209 A1 Sep. 12, 2002

(51) Int. Cl.$^7$ ................................................. G06F 12/00
(52) U.S. Cl. ........................ 711/146; 711/121; 711/144; 711/168; 709/248
(58) Field of Search ................................. 711/121, 146, 711/118, 141, 144, 145, 168; 709/248

(56) References Cited

U.S. PATENT DOCUMENTS

| | | |
|---|---|---|
| 5,345,578 A | 9/1994 | Manasse |
| 5,355,467 A * | 10/1994 | MacWilliams et al. ...... 711/146 |
| 5,526,510 A | 6/1996 | Akkary et al. |
| 5,774,700 A * | 6/1998 | Fisch et al. ................. 711/146 |
| 5,796,977 A | 8/1998 | Sarangdhar et al. |
| 6,345,321 B1 * | 2/2002 | Litaize et al. ................. 710/23 |

OTHER PUBLICATIONS

U.S. patent application Ser. No. 09/749,054, Arimilli et al., filed Dec. 27, 2000.
U.S. patent application Ser. No. 09/749,349, Arimilli et al., filed Dec. 27, 2000.
U.S. patent application Ser. No. 09/749,348, Arimilli et al., filed Dec. 27, 2000.

* cited by examiner

Primary Examiner—Hiep T. Nguyen
Assistant Examiner—Ngoc V Dinh
(74) Attorney, Agent, or Firm—Casimer K. Salys; Bracewell & Patterson, L.L.P.

(57) ABSTRACT

A multiprocessor computer system in which snoop operations of the caches are synchronized to allow the issuance of a cache operation during a cycle which is selected based on the particular manner in which the caches have been synchronized. Each cache controller is aware of when these synchronized snoop tenures occur, and can target these cycles for certain types of requests that are sensitive to snooper retries, such as kill-type operations. The synchronization may set up a priority scheme for systems with multiple interconnect buses, or may synchronize the refresh cycles of the DRAM memory of the snooper's directory. In another aspect of the invention, windows are created during which a directory will not receive write operations (i.e., the directory is reserved for only read-type operations). The invention may be implemented in a cache hierarchy which provides memory arranged in banks, the banks being similarly synchronized. The invention is not limited to any particular type of instruction, and the synchronization functionality may be hardware or software programmable.

14 Claims, 3 Drawing Sheets

```
                  | 0 | 1 | 2 | 3 | 4 | 5 | 6 | 7 | 8 |
L3 Select priority  A   B   A   B   A   B   A   B   A
Sys Bus A           a0  a2          a3  a4
Sys Bus B           a1                  a5      a6
```

*Fig. 3*

```
                  | 0 | 1 | 2 | 3 | 4 | 5 | 6 | 7 | 8 | 9 | 10 |
L4 Dir Available    *   *   *                   *   *   *   *
Refresh window              ◄----- refresh -----►
Sys Bus             a0  a2          a3  a4
```

*Fig. 4*

```
                  | 0 | 1 | 2 | 3 | 4 | 5 | 6 | 7 | 8 |
L4 Bank Cycle       b0  b1  b2  b3  b0  b1  b2  b3  b0
Sys Bus             a0  a2          a3  a4
```

*Fig. 5*

MULTIPROCESSOR SYSTEM SNOOP SCHEDULING MECHANISM FOR LIMITED BANDWIDTH SNOOPERS

CROSS-REFERENCES TO RELATED APPLICATIONS

The present invention is related to the following applications filed concurrently with this application, each of which is hereby incorporated: U.S. patent application Ser. No. 09/749,054 entitled "MULTIPROCESSOR SYSTEM SNOOP SCHEDULING MECHANISM FOR LIMITED BANDWIDTH SNOOPERS PERFORMING DIRECTORY UPDATE"; U.S. patent application Ser. No. 09/749,349 entitled "MULTIPROCESSOR SYSTEM SNOOP SCHEDULING MECHANISM FOR LIMITED BANDWIDTH SNOOPERS WITH BANKED DIRECTORY IMPLEMENTATION"; and U.S. patent application Ser. No. 09/749,348 entitled "MULTIPROCESSOR SYSTEM SNOOP SCHEDULING MECHANISM FOR LIMITED BANDWIDTH SNOOPERS THAT USES DYNAMIC HARDWARE/SOFTWARE CONTROLS".

BACKGROUND OF THE INVENTION

1. Field of the Invention

The present invention generally relates to computer systems, and more particularly to a method of efficiently scheduling snoop operations between caches in a multiprocessor computer system.

2. Description of Related Art

The basic structure of a conventional multiprocessor computer system 10 is shown in FIG. 1. Computer system 10 has several processing units, two of which 12a and 12b are depicted, which are connected to various peripheral devices, including input/output (I/O) devices 14 (such as a display monitor, keyboard, graphical pointer (mouse), and a permanent storage device or hard disk), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20, or direct memory access channels (not shown). Computer system 10 may have many additional components which are not shown, such as serial, parallel, and universal system bus (USB) ports for connection to, e.g., modems, printers or scanners. There are other components that might be used in conjunction with those shown in the block diagram of FIG. 1; for example, a display adapter might be used to control a video display monitor, a memory controller can be used to access memory 16, etc. The computer can also have more than two processing units.

In a symmetric multi-processor (SMP) computer, all of the processing units are generally identical, that is, they all use a common set or subset of instructions and protocols to operate, and generally have the same architecture. A typical processing unit includes a processor core 22 having a plurality of registers and execution units, which carry out program instructions in order to operate the computer. An exemplary processing unit includes the PowerPC™ processor marketed by International Business Machines Corp. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the additional latency of loading the values from memory 16. These caches are referred to as "on-board" when they are integrally packaged with the processor core on a single integrated chip 28. Each cache is associated with a cache controller (not shown) that manages the transfer of data and instructions between the processor core and the cache memory.

A processing unit can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches.

In a multi-level cache, if a copy of a value is in every level of the cache, the cache hierarchy is referred to as being "inclusive." It is not necessary, however, to keep a copy of each value in the lower levels, and an inclusivity bit field may be added to the caches to indicate whether or not the cache is inclusive. For example, a three-level cache structure might provide an L3 cache which was not inclusive, such that a value residing in the L2 cache might not be present in the L3 cache. In this example, if an L2 cache issues a read command for a value that is not present in any of the caches of that processing unit, it can be passed to that L2 cache without (necessarily) loading it into the L3 cache.

In an SMP computer, it is important to provide a coherent memory system, that is, to cause write operations to each individual memory location to be serialized in some order for all processors. By way of example, assume a location in memory is modified by a sequence of write operations to take on the values: 1, 2, 3, 4. In a cache coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent". Nearly all coherency protocols operate only to the granularity of the size of a cache block. That is to say, the coherency protocol controls the movement of and write permissions for operand data or instructions on a cache block basis, and not separately for each individual memory location.

There are a number of protocols and techniques for achieving cache coherence that are known to those skilled in the art. All of these mechanisms for maintaining coherency require that the protocols allow only one processor to have a "permission" that allows a write operation to a given memory location (cache block) at any given point in time. As a consequence of this requirement, whenever a processing element attempts to write to a memory location, it must first inform all other processing elements of its desire to write the location and receive permission from all other processing elements to carry out the write.

To implement cache coherency in a system, the processors communicate over a common generalized interconnect (i.e., bus 20). The processors pass messages over the interconnect indicating their desire to read from or write to memory locations. When an operation is placed on the interconnect, all of the other processors "snoop" (monitor) this operation and decide if the state of their caches can allow the requested operation to proceed and, if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

This communication is necessary because, in systems with caches, the most recent valid copy of a given block of memory may have moved from the system memory 16 to one or more of the caches in the system (as mentioned above). If a processor (say 12a) attempts to access a memory location not present within its cache hierarchy, the correct version of the block, which contains the actual (current) value for the memory location, may either be in the system memory 16 or in one of more of the caches in another processing unit, e.g. processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower cache levels, e.g., the L3 cache. If the block is not present in the lower level caches, the request is then presented on the generalized interconnect (20) to be serviced. Once an operation has been placed on the generalized interconnect, all other processing units snoop the operation and determine if the block is present in their caches. If a given processing unit has the block requested by processing unit in its L1 cache, and the value in that block is modified, and any lower level caches also have copies of the block, then their copies are stale, since the copy in the processor's cache is modified. Therefore, when the lowest level cache (e.g., L3) of the processing unit snoops the read operation, it will determine that the block requested is present and modified in a higher level cache. When this occurs with an in-line cache structure, the L3 cache places a message on the generalized interconnect informing the processing unit that it must "retry" it's operation again at a later time, because the actual value of the memory location is in the L1 cache at the top of the memory hierarchy and must be retrieved to make it available to service the read request of the initiating processing unit.

Once the request from an initiating processing unit has been retried, the L3 cache begins a process to retrieve the modified value from the L1 cache and make it available at the L3 cache, main memory or both, depending on the exact details of the implementation. To retrieve the block from the higher level caches, the L3 cache sends messages through the inter-cache connections to the higher level caches, requesting that the block be retrieved. These messages propagate up the processing unit hierarchy until they reach the L1 cache and cause the block to be moved down the hierarchy to the lowest level (L3 or main memory) to be able to service the request from the initiating processing unit.

The initiating processing unit eventually re-presents the read request on the generalized interconnect. At this point, however, the modified value has been retrieved from the L1 cache of a processing unit and placed into system memory, and the read request from the initiating processor will be satisfied. The scenario just described is commonly referred to as a "snoop push". A read request is snooped on the generalized interconnect which causes the processing unit to "push" the block to the bottom of the hierarchy to satisfy the read request made by the initiating processing unit.

Thus, when a processor wishes to read or write a block, it must communicate that desire with the other processing units in the system in order to maintain cache coherence. To achieve this, the cache coherence protocol associates with each block in each level of the cache hierarchy, a status indicator indicating the current "state" of the block. The state information is used to allow certain optimizations in the coherency protocol that reduce message traffic on the generalized interconnect and the inter-cache connections. As one example of this mechanism, when a processing unit executes a read it receives a message indicating whether or not the read must be retried (i.e., reissued later). If the read operation is not retried, the message usually also includes information allowing the processing unit to determine if any other processing unit also has a still active copy of the block (this is accomplished by having the other lowest level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive". If a block is marked exclusive it is permissible to allow the processing unit to later write the block without first communicating with other processing units in the system because no other processing unit has a copy of the block. Therefore, it is possible for a processor to read or write a location without first communicating this intention onto the interconnection, but only where the coherency protocol has ensured that no other processor has an interest in the block.

The foregoing cache coherency technique is implemented in a specific prior art protocol referred to as "MESI." In this protocol, a cache block can be in one of four states, "M" (Modified), "E" (Exclusive), "S" (Shared) or "I" (Invalid). Under the MESI protocol, each cache entry (e.g., a 32-byte sector) has two additional bits which indicate the state of the entry, out of the four possible states. Depending upon the initial state of the entry and the type of access sought by the requesting processor, the state may be changed, and a particular state is set for the entry in the requesting processor's cache. For example, when a sector is in the Modified state, the addressed sector is valid only in the cache having the modified sector, and the modified value has not been written back to system memory. When a sector is Exclusive, it is present only in the noted sector, and is consistent with system memory. If a sector is Shared, it is valid in that cache and in at least one other cache, all of the shared sectors being consistent with system memory. Finally, when a sector is Invalid, it indicates that the addressed sector is not resident in the cache.

While these various cache operations ensure proper coherency and allow for the sharing of memory between the different processing units, there are still several problems regarding the manner in which these operations are carried out. For example, certain system bus commands (i.e., kill-type commands such as the PowerPC™ DClaim or read-with-intent-to-modify commands) must be snooped by all caches in order to complete. If any snooper on the system bus retries the requested command (e.g., due to a directory busy condition) the master must re-issue the request. This condition can create poor performance (or livelock situations) because the snoopers are not synchronized, and there is no assurance that snoopers with limited bandwidth will able to snoop each operation.

Some systems may provide a second system bus to allow two addresses to be transmitted. In the situation wherein all L3 caches can snoop only one address (of the two address that may arrive on the two system buses), and both of these system buses are saturated, the L3 must uses an algorithm to randomly pick the snoop from one of the buses. This approach leads to very poor odds for getting a kill-type operation through cleanly (i.e. without being retried). Assuming that, when two addresses are presented on the system buses at the same time to a given L3 cache, then there is only a 50% chance that the snooper will choose the kill operation. For larger SMP systems (e.g., 64-way), the snooping traffic is exponentially complicated, and the odds that all 64 L3 snoopers will choose the address for the pending kill operation $(0.5)^{64}$, i.e., extremely unlikely.

Another example involves the refresh time where dynamic random-access memory (DRAM) circuits are used for an L4 cache. If each L4 directory refresh time occurs every 512 clock cycles and lasts four cycles, and each L4 cache is performing the refresh asynchronously with respect to other L4 caches, then the odds of an address being sent while the L4 cache is refreshing are $(4/512)^{64}$, again extremely unlikely. This factor will thus lead to further retries and delays.

Typically, the L3 and L4 directories are single ported such that in any given cycle, either a read or write (but not both) can be performed. In many cases, these write operations take multiple cycles such that once initiated, a directory read (i.e. snoop) cannot be immediately performed. This situation is similar to that described above in that, if many snoopers are performing directory writes and these writes happen asynchronously to each other, snoops have a high probability of getting retried by a directory that has already committed to a write and is in a busy condition.

When a directory, like the L4 DRAM directory described above, is off-chip, it is often partitioned into several banks (e.g., bank0,1,2,3). Bank selection is typically achieved through an address hash. For example, if the cache line size is 128 bytes and the address is a 64-bit addr(0:63), then the bank selection may use address bits 55:56 to determine which bank to use. Due to the nature of a DRAM bank, a new read may only be issued every four system bus cycles. Since none of the L4 directories are synchronized or aligned, a master device that issues an address which hashes into a certain bank may find that for each attempt, it runs into an L4 snooper that is in a bank busy condition(i.e. must retry) because it has already committed to a snoop that occurred to that same bank one or two cycles earlier.

In light of the foregoing, it would be desirable to devise an improved method of scheduling snoop traffic in a multiprocessor computer system. It would be further advantageous if the method could utilize existing infrastructure without adding excessive complexity or cost, yet still ensure that certain instructions were snooped within a limited time period.

SUMMARY OF THE INVENTION

It is therefore one object of the present invention to provide an improved method of handling cache operations in a multiprocessor computer system.

It is another object of the present invention to provide such a method that efficiently schedules snoop operations between processing units and their caches.

It is yet another object of the present invention to provide a computer system which ensures that certain operations (e.g., kill-type operations) are executed within a limited time frame and without repeated retry attempts.

The foregoing objects are achieved in a method of communicating between caches of different processing units in a multiprocessor computer system, generally comprising the steps of synchronizing snoop operations of the caches, and then issuing a cache operation during a cycle which is selected based on the manner in which the caches have been synchronized. Each master device (cache controller) is aware of when these synchronized, or aligned, snoop tenures occur, so the masters can target these cycles for certain types of requests that are sensitive to snooper retries, such as kill-type operations. In one implementation, wherein there are multiple system buses for increased bandwidth, the synchronization sets up a matching priority scheme, e.g., where all snoopers choose a first bus over the second bus in even-numbered cycles, and choose the second bus over the first bus in odd-numbered cycles. Alternatively (or additionally), the DRAM memory of the snooper's directory can be synchronized relative to the DRAM refresh window, such that all snooper directories are always performing the refreshes at the same time. In another aspect of the present invention, the system may be initialized by a system bus command which instructs all L3 snoopers to start a counter, to create appropriate windows of time during which a directory will not receive write operations (i.e., the directory is reserved for only read-type operations). In this manner, masters can again issue critical operations when it is known that the snooper's directories are aligned to take snoops. During this "golden" cycle, all snoopers postpone any non-snoop activity, such as write-type operations. The invention may also be implemented in a cache hierarchy which provides memory arranged in banks. In such a system, a system bus initialization command may be used to trigger the snoopers into starting a rotating counter as to when they will accept snoops to a certain bank. The invention is not limited to any particular type of instruction as a candidate for special treatment using the aligned or golden cycles, and the functionality may be hardware or software programmable.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 3 is a timing diagram illustrating an example of synchronized L3 cache select priorities and address tenures on the system buses of FIG. 2, according to one implementation of the present invention;

FIG. 4 is a timing diagram illustrating an example of L4 directories having synchronized refresh cycles, according to another implementation of the present invention; and FIG. 5 is a timing diagram illustrating an example of synchronized L4 directory banks, according to a further implementation of the present invention.

DESCRIPTION OF AN ILLUSTRATIVE EMBODIMENT

Figure 1:
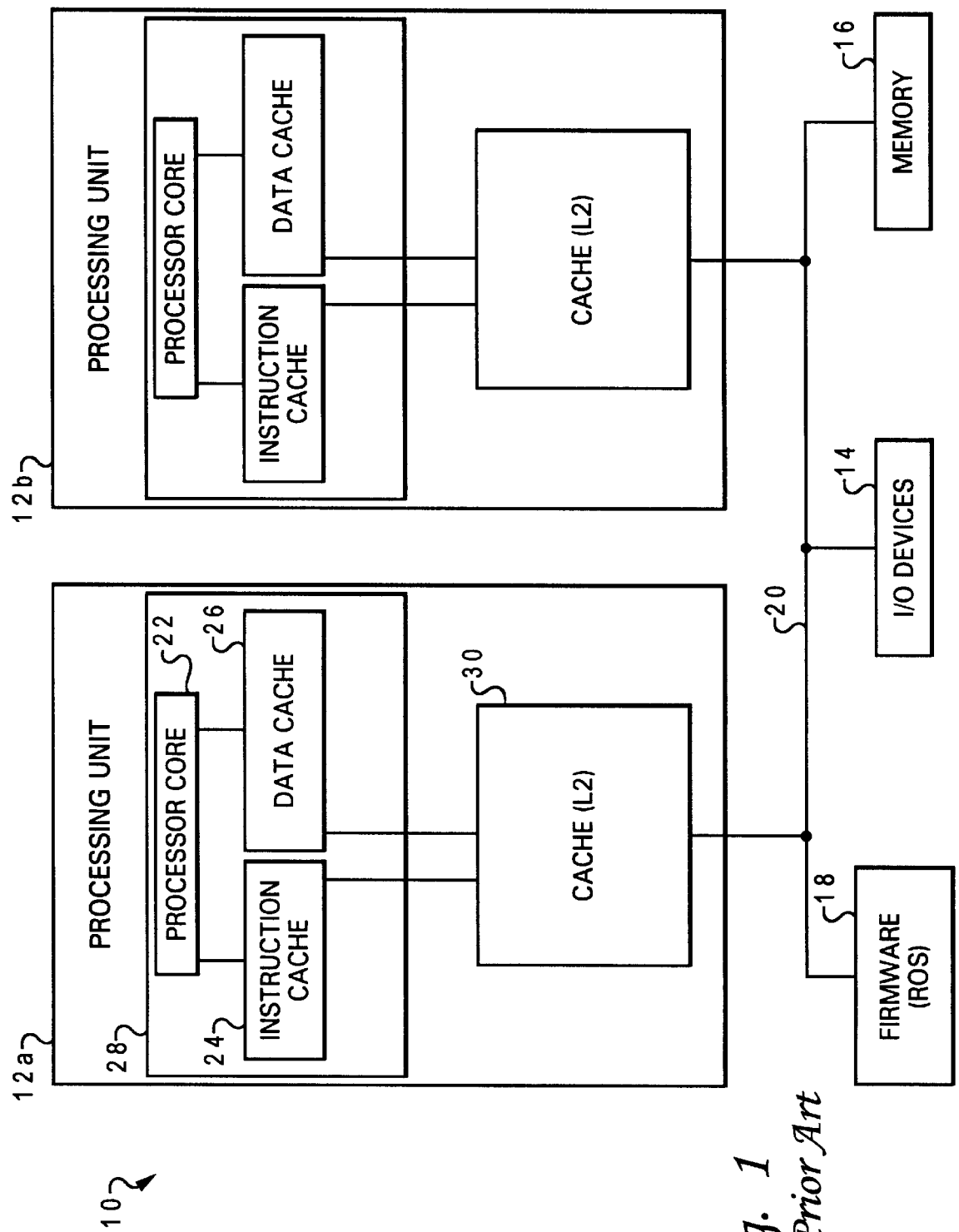
FIG. 1 is a block diagram of a prior art multiprocessor computer system.
Figure 2:
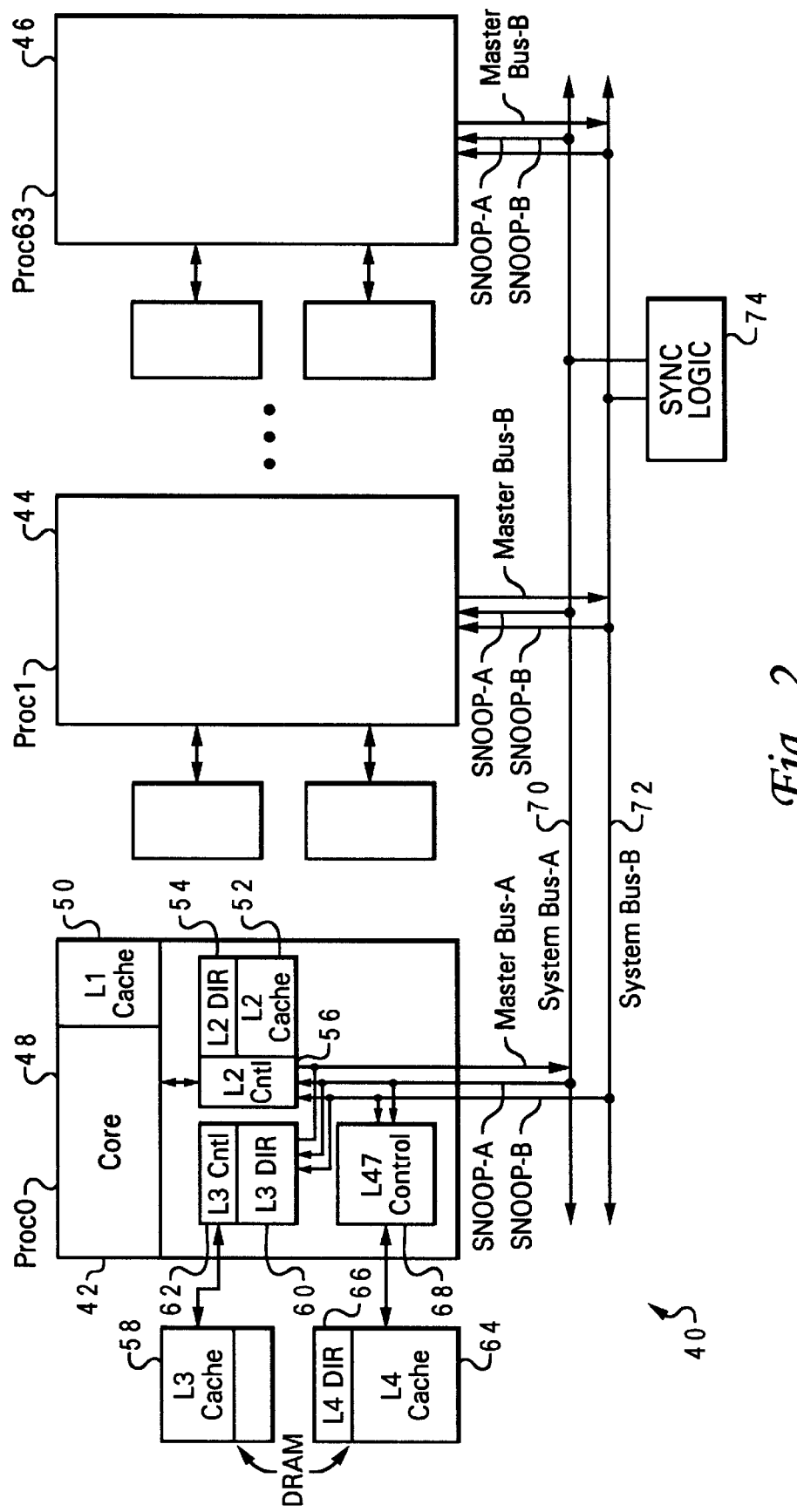
FIG. 2 is a block diagram of one embodiment of a multiprocessor computer system constructed in accordance with the present invention, having synchronized caches with a preferential snoop cycle.

With reference now to FIG. 2, there is depicted one embodiment 40 of a multiprocessor computer system. In this example, multiprocessor computer system 40 is a very large, symmetric multiprocessor (SMP) having 64 processing units, including processing units 42, 44 and 46 (processing units 0, 1 and 63). As illustrated with processing unit 44, each of these processing units includes a processing core 48, an L1 cache 50, an L2 cache 52 which includes L2 directory 54 and L2 controller 56, an L3 cache 58 which includes L3 directory 60 and L3 controller 62, and an L4 cache 64 which includes L4 directory 66 and L4 controller 68. Dual system buses, that is, system bus A 70 and system bus B 72 are provided for increased address bandwidth. A given master is connected to only one of these two buses, and can only issue a request on their one respective bus, but all snoopers see both system bus A 70 and system bus B 72.

In the preferred embodiment, L2 directory 54 is relatively fast (due to its small size) such that it can snoop both bus A and B, i.e., L2 directory 54 can perform two reads every system bus cycle, so is able to handle 100% of the system bus address bandwidth. L3 directory 60 is on-chip and slower (larger than L2 dir), such that it can only perform one read/snoop for every system bus cycle, i.e., it can only process one-half of the maximum system bus address bandwidth. L4 directory 66 is located off-chip (not on the processor core chip) in DRAM-type memory. The DRAM 64 is partitioned into multiple banks (e.g., four). An address hash function is used to determine which bank the cache line is in. A given bank can only be accessed every 8 cycles, and L4 DRAM 64 must perform a refresh every 512 cycles. The refresh sequence takes four system bus cycles. For purposes of illustration, it is assumed that if L3 directory 60 or L4 directory 66 receives a snoop that cannot be processed (e.g. two snoops in one cycle or a snoop during the DRAM refresh), then the snooper must retry that snooped operation.

In order to ensure that there is a opportunity for all of the snoopers to snoop the buses at the same time, and thereby guarantee that designated operations will properly execute without undue delay, the snoopers that have a limited snoop bandwidth (i.e., the L3 and L4 snoopers) are synchronized, as explained further below. In addition, the masters are aware of when these periodic aligned snoop tenures occur, so the masters can target these cycles for certain types of requests that are sensitive to snooper retries.

When the system buses are initialized (i.e., at power on), all L3 snoopers are triggered via a system bus initialization command. This command may be built into the system controller, or provided by separate synchronization logic 74. This synchronization sets up a matching priority scheme, e.g., where all L3s choose bus A 70 over bus B 72 in the even cycles and choose bus B 72 over bus A 70 in the odd cycles (in the case where addresses are presented on bus A and B in the same cycle). The masters are then able to choose whether they want to send an address on an even or odd cycle for any commands that require guaranteed execution (i.e., so the address will not be retried due to a snoop directory busy/retry condition). For example, a master can target its kill-type operations (such as the PowerPC™ DClaim or read-with-intent-to-modify (RWITM) commands) to the aligned snoop cycles, while regular read operations may be issued in either the golden or unaligned cycles.

FIG. 3 illustrates an example of the timing of the L3 select priorities and address tenures on the system bus. The "A" or "B" select priority indicated for each cycle represents which bus all L3 snoopers will choose if an address is valid on both bus A and B at the same time. For example, in cycle 0, the L3 snoopers will all choose address "a0" on system bus A 70. In cycle 5, address "a5" on system bus B 72 is chosen.

In an alternative implementation of the present invention, when the system bus is initialized (again, at power on), all L4 snoopers are triggered and synchronized by a system bus initialization command, but for a different purpose. This initialization command causes each L4 snooper to start a counter as to when and for how long to perform their L4 DRAM refreshes, such that all L4 directories are always performing the refreshes at the same time. In this manner, all masters know which system bus cycles are the L4 snooper-aligned cycles. The masters can then target critical requests to be issued only in the L4 snooper phase-aligned cycles.

FIG. 4 illustrates how all of the L4 directories have synchronized refresh cycles. The asterisk "*" represents a cycle wherein the L4 snooper is able to perform a snoop read (i.e., not performing a DRAM refresh). Requests issued by a master in these cycles are guaranteed to not conflict with the L4 refresh window. In this example, addresses "a0" and "a2" are accepted by the L4 for snooping but addresses "a3" and "a4" must be retried.

In another aspect of the present invention, the system may be initialized by a system bus command which instructs all L3 snoopers to start a counter, to create appropriate windows of time during which a directory will not receive write operations (i.e., the directory is reserved for only read-type operations). In this manner, masters can again issue critical operations when it is known that the snooper's directories are aligned to take snoops. During this special ("golden") cycle, all snoopers postpone any non-snoop activity; postponed operations are issued after the golden cycle. The golden tenure may occur, e.g., every 16 cycles.

The present invention may be implemented in a cache hierarchy which provides memory arranged in banks. In such a system, a system bus initialization command may be used to trigger all L4 snoopers into starting a rotating counter as to when they will accept snoops to a certain bank. The master can then again issue critical requests in the cycle during which it is known that the L4 directory banks will all be accepting addresses.

FIG. 5 illustrates an example of the timing of the L4 bank cycles with system bus address tenures. The banks are denoted by "b0," "b1," "b2," and "b3" and, e.g., "b0" represents the system bus cycle when all of the L4 directories are accepting snoop addresses for their DRAM directory bank 0. A master issues desired operations based on the address in the particular cycle that is known to allow the L4 to accept this address, using address hashing. Address "a0" is accepted by all L4 directories if it hashes to bank0 (otherwise it must be retried by the L4 controller).

The foregoing discussion contemplates instructions such as kill-type operations as being the primary candidates for special treatment using the aligned or golden cycles. The invention may further be applied, however, to various instructions based on programmable hardware or software mechanisms. For example, the hardware (cache controller) may dynamically monitor previous retry attempts; if a particular operation has been retried a preset number of times (say three), then the cache can schedule this delayed operation for the next golden cycle. Software mechanisms can include an enhanced instruction set, e.g., that provides hints (flags or bits) in the instructions which are used to identify a given instruction as being critical and thus to be scheduled for an aligned or golden cycle. Such a mechanism could be included within an application, or as part of the computer's operating system.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of communicating in a computer system including a system interconnect and a plurality of processing units each having a respective associated cache among a plurality of caches, wherein said system interconnect includes first and second address interconnects and wherein each of said plurality of said caches is coupled to both said first and second address interconnects, said method comprising:

synchronizing snoop operation of the plurality of caches, said synchronizing including establishing, for all of the plurality of caches, the first address interconnect as a priority interconnect for snooping during periodic intervals such that, during said periodic intervals, said plurality of caches preferentially service an operation snooped on said first address interconnect over an operation snooped on said second address interconnect; and issuing an operation on the first address interconnect from one of the plurality of processing units during one of the periodic intervals.

2. The method of claim 1, wherein said synchronizing includes initializing the plurality of caches using a command transmitted on said system interconnect.

3. The method of claim 1, wherein said issuing step includes the step of selecting the operation for issuing on said system interconnect based upon its sensitivity to snooper retries.

4. The method of claim 3, wherein said operation is a kill-type operation.

5. The method of claim 1, wherein said establishing step establishes the first address interconnect as the priority interconnect for even cycles, and further establishes the second address interconnect as the priority interconnect for odd cycles.

6. The method of claim 1, wherein:
the plurality of caches each have a separate DRAM directory; and
said synchronizing step includes the step of phase-synchronizing refresh cycles of all of the DRAM directories.

7. The method of claim 6, wherein said synchronizing step ensures that each DRAM directory has a refresh window with a common tenure.

8. A computer system comprising:
a system memory device;
a system interconnect interconnecting said plurality of processing units and said system memory device, wherein said system interconnect includes first and second address interconnects for concurrently transmitting first and second addresses; and
a plurality of processing units each having a respective one of a plurality of caches, wherein all of the plurality of caches preferentially snoop the first address interconnect during periodic intervals such that, during said periodic intervals, said plurality of caches preferentially service an operation snooped on said first address interconnect over an operation snooped on said second address interconnect;
wherein one of said plurality of processing units issues an operation on said first address interconnect during one of said periodic intervals.

9. The computer system of claim 8, and further comprising means for initializing said plurality of caches using a command on said system interconnect.

10. The computer system of claim 8, wherein said processing unit includes means for selecting the operation for issuing based upon its sensitivity to snooper retries.

11. The computer system of claim 10, wherein said operation is a kill-type operation.

12. The computer system of claim 8, wherein said plurality of caches all preferentially snoop the first address interconnect during even cycles, and all preferentially snoop said second address interconnect during odd cycles.

13. The computer system of claim 8, wherein:
each of said plurality of caches has a separate DRAM directory; and
said synchronizing means includes means for phase-synchronizing refresh cycles of all of said DRAM directories.

14. The computer system of claim 13, wherein each DRAM directory has a refresh window with a common tenure.

* * * * *